May 24, 1949.  R. E. BOULTON  2,471,192
SHIFTING SHOVEL LOADER
Filed Feb. 12, 1947  4 Sheets-Sheet 1
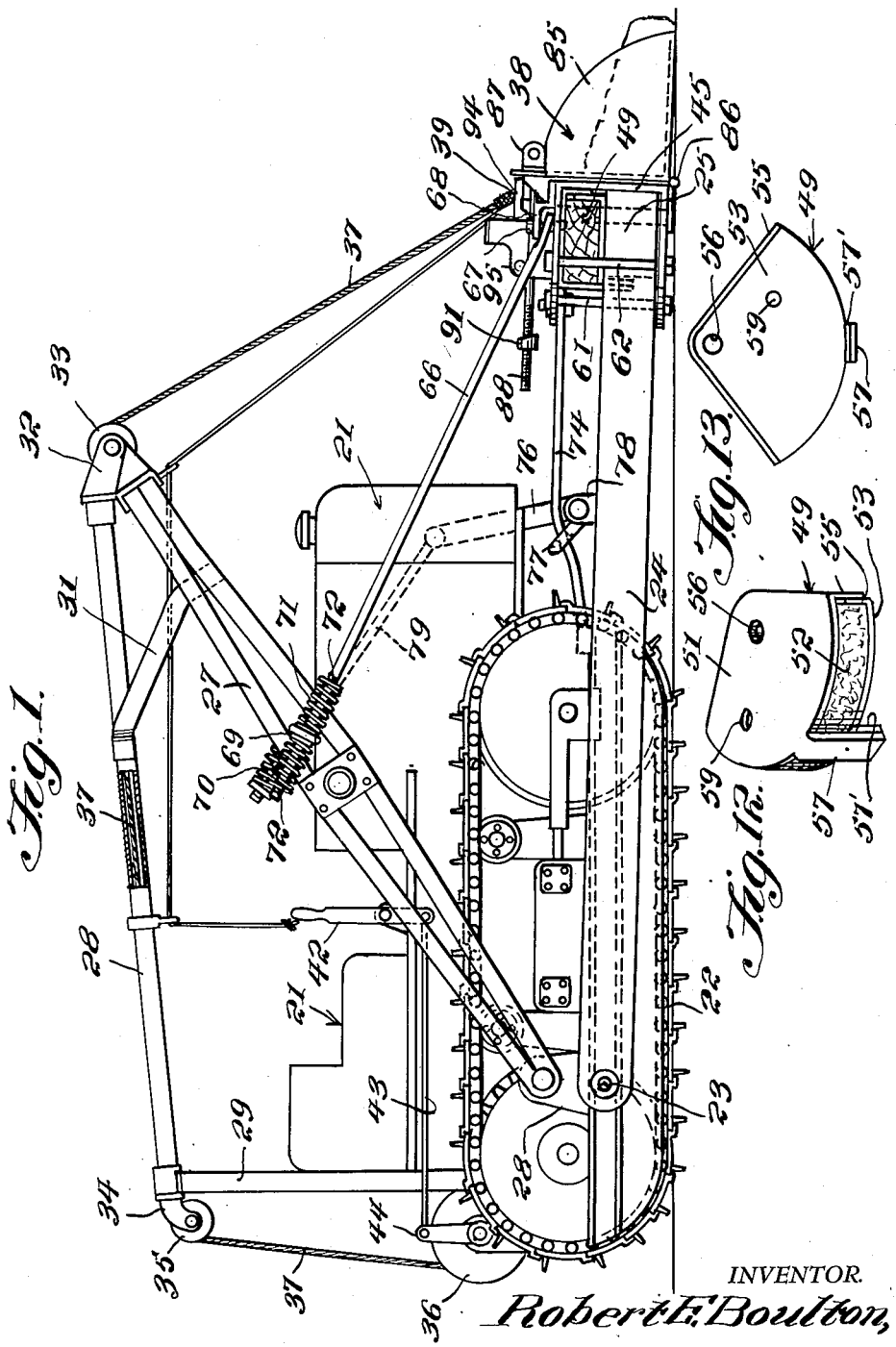
INVENTOR.
Robert E. Boulton,
BY Victor J. Evans & Co.
ATTORNEYS

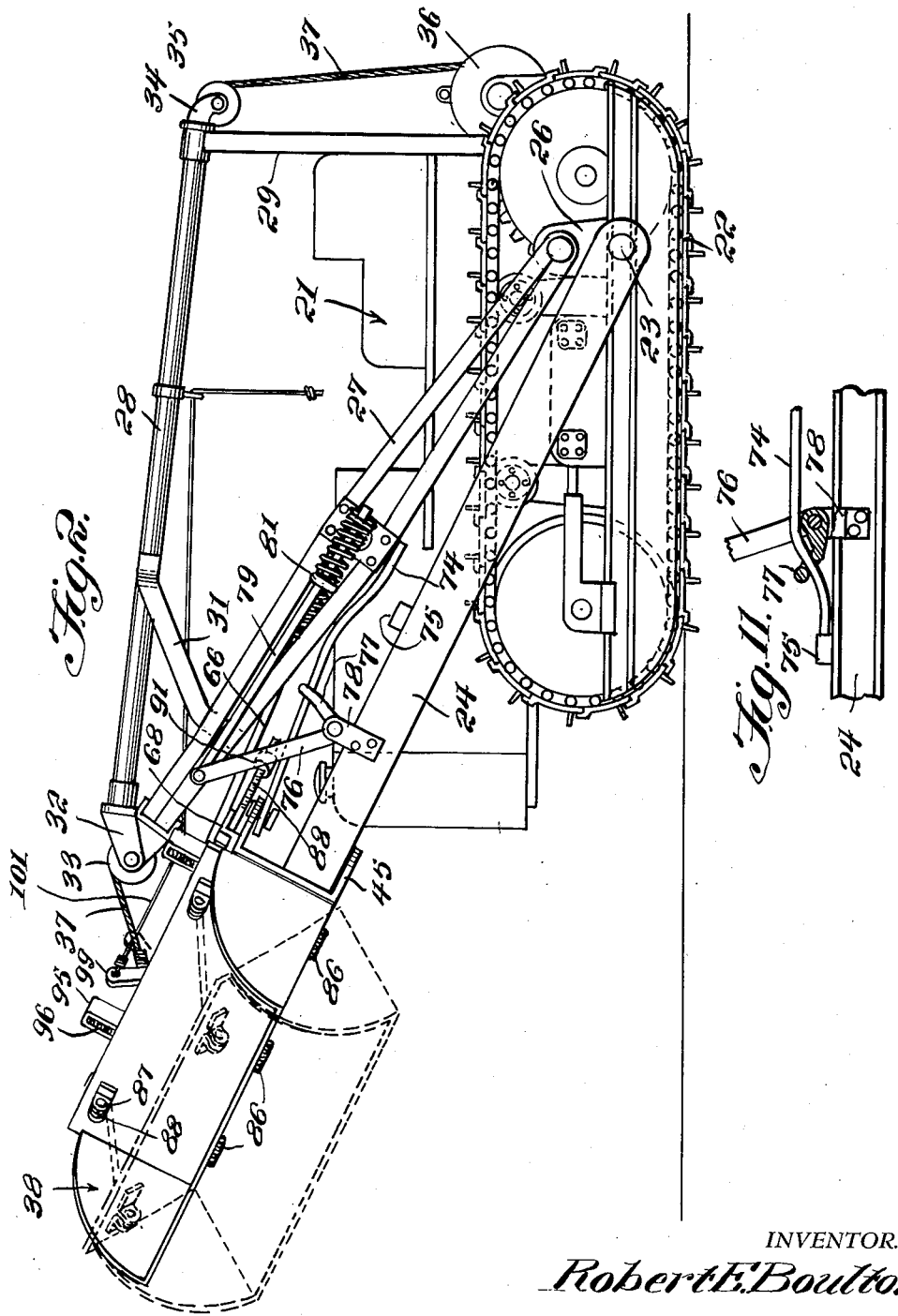

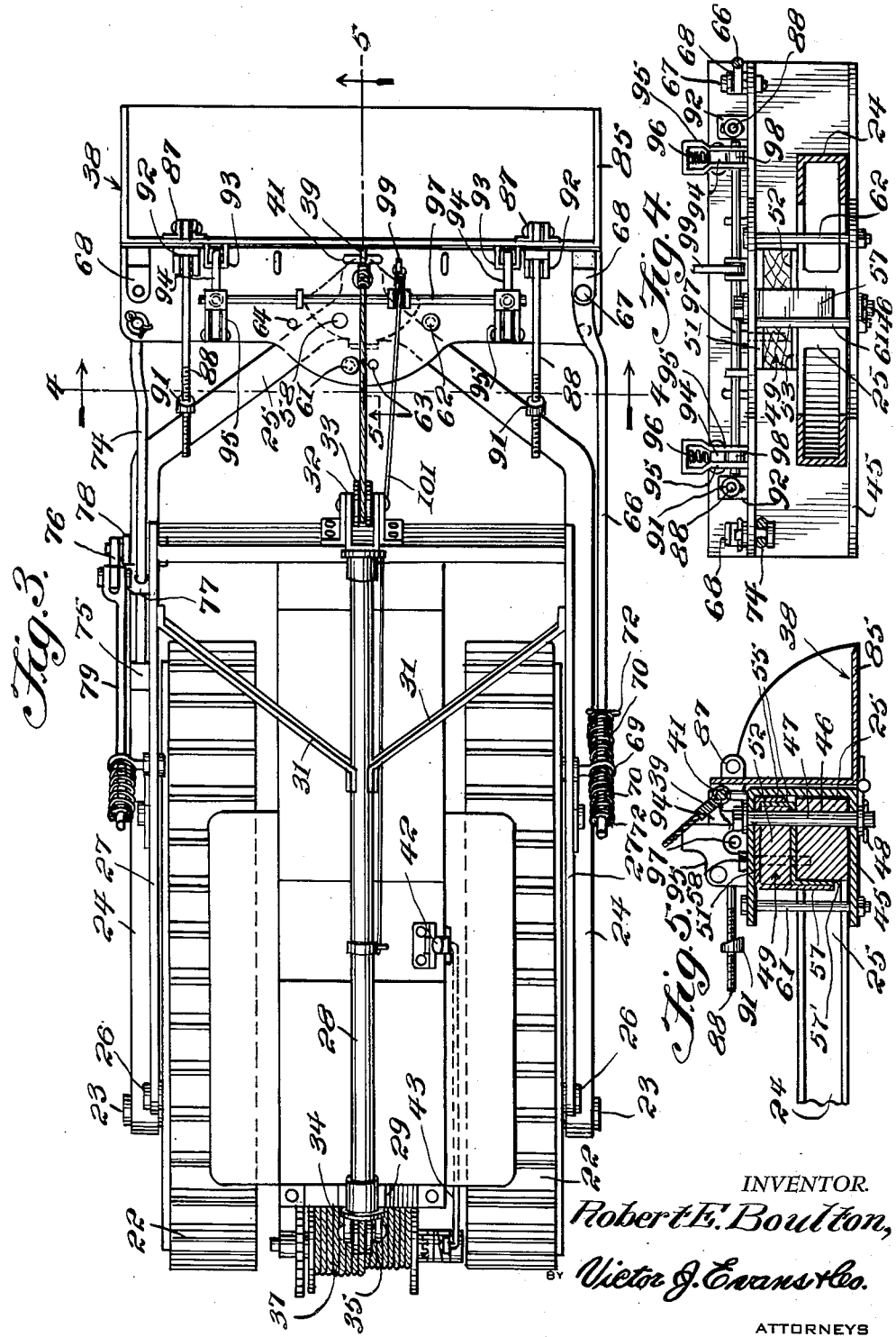

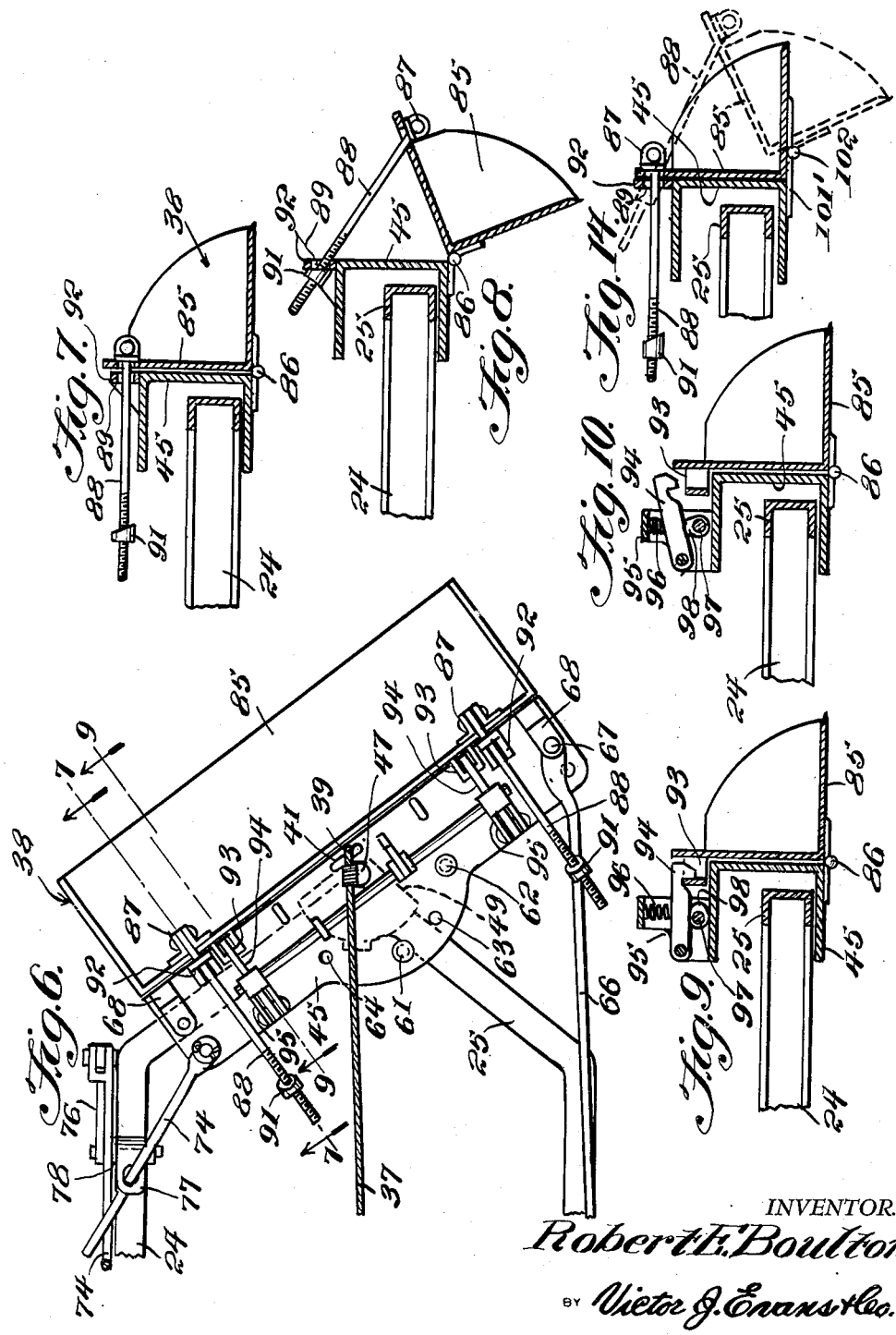

Patented May 24, 1949

2,471,192

UNITED STATES PATENT OFFICE 2,471,192

SHIFTING SHOVEL LOADER

Robert E. Boulton, Rifle, Colo.

Application February 12, 1947, Serial No. 727,997

7 Claims. (Cl. 214—132)

1

This invention relates to earth moving shovels adapted for attachment to crawler type tractors.

It is an object of the present invention to provide an earth working shovel which is adapted for use in building ditches, cleaning ditches, loading gravel onto trucks, loading manure spreaders, cleaning corral feed lots, without the assistance of any other machine other than the crawler tractor on which the implement is mounted and wherein the shovel which is attached to the ends of the lifting arms is so connected that it can pivot or shift from one side to the other whereby to facilitate the unloading of the shovel without the requirement of having to completely turn the tractor from the direction in which the shoveling operation is being effected.

It is another object of the present invention to provide an implement which is used for cleaning or building ditches which will place the dirt evenly along the ditch banks as the dirt is taken from the ditches whereby to leave the ditch banks in a smooth condition.

It is another object of the present invention to provide a shovel arrangement which can be disposed upon a light crawler tractor without causing the same to be top heavy and which will be particularly adapted for cleaning irrigating ditches and corrals in mountainous country.

It is another object of the present invention to provide a shifting shovel which can fit any type of tractor which has lifting arms thereon for use with the ordinary dozer blade and which can be adapted for use with a tractor wherein the arms are lifted either by cable action or with a hydraulic device.

Other objects of the invention are to provide a shifting shovel which is of simple construction, easy to install upon a crawler tractor, inexpensive to manufacture and which is efficient in operation.

For other objects and for a better understanding of the invention, reference may be had to the following detail description taken in connection with the accompanying drawing, in which Fig. 1 is a side elevational view showing the shovel in the ground position and connected to a crawler type tractor with an overhead structure connected by a cable with the shovel to lift the same.

Fig. 2 is a side elevational view of the shovel in the raised position on the tractor and with the same shifted to an angle to discharge the dirt to the side of the tractor.

Fig. 3 is a top plan view of the tractor and

2 of the lifting shovel in the ground position as shown in Fig. 1.

Fig. 4 is a cross-sectional view taken on line 4—4 of Fig. 3 and looking in the direction of the arrows thereof and upon the rear of the shovel supporting structure which is pivotally connected to the end of the lifting arm.

Fig. 5 is a longitudinal cross-sectional view taken through the center of the shifting shovel arrangement and looking upon the pivot pin thereof and as viewed on line 5—5 of Fig. 3 and looking in the direction of the arrows thereof.

Fig. 6 is a fragmentary view of a lifting arm and looking in plan upon the shovel which has been shifted to one side.

Fig. 7 is a cross-sectional view taken on line 7—7 of Fig. 6 and looking in the direction of the arrows thereof and taken through the shovel arrangement with the shovel in its raised and locked position.

Fig. 8 is a sectional view taken generally on the same line as the view of Fig. 7 is taken except that the shovel has been released and is in its lowered position.

Fig. 9 is a cross-sectional view taken through the shovel arrangement and as viewed on line 9—9 of Fig. 6 and looking in the direction of the arrows thereof and upon the latch device for retaining the shovel in its raised position.

Fig. 10 is a similar view to that shown in Fig. 9 and taken on the same lines except that the latch has been raised to release the shovel.

Fig. 11 is a fragmentary view of a lifting arm and looking in side elevation upon the locking means for the shovel arrangement when in the lowered position to prevent the same from shifting about its central pivot.

Fig. 12 is a perspective view of the three part supporting platform on which the shifting shovel arrangement is supported and connected to the ends of the lifting arms of the tractor.

Fig. 13 is a top plan view of the platform shown in Fig. 12.

Fig. 14 is a cross-sectional view taken through the shifting shovel arrangement and showing a modified means for connecting the shovel to its support for pivotal movement whereby to provide an opening for dirt in behind the shovel to fall out.

Referring now to the figures, 21 represents a tractor of the crawler type having crawler treads 22 engaging with the ground and causing the movement of the tractor. To the opposite sides of the tractor and near the rear end thereof there are pivotally connected as indicated at 23 side lifting members 24 which extend forwardly along the sides of the tractor and converge inwardly as indicated at 25 to join with one another at a central location in front of the tractor. These lifting members are the usual members which are used when the tractor is fitted with a bulldozer. Extending upwardly from a point 26 on the tractor frame and forwardly is a super structure 27 which is also anchored to the sides of the tractor. This structure 27 extends to a location above the forward end of the tractor and is connected by a tubing 28 to a vertically extending member 29 on the rear of the tractor. Brace members 31 extend between the sides of the super structure and the tubing 28. Extending forwardly from the forward end of the tubing 28 is a bracket 32 on which is mounted a pulley 33. Extending rearwardly from the rear end of the tubing is also a bracket 34 containing a pulley 35. On the rear of the tractor is a winch 36 driven by the tractor power plant and on which is wound a cable 37 which extends upwardly over pulley 35, through tubing 28, over pulley 33 and is adapted to be connected to the shifting shovel arrangement indicated generally at 38 which is mounted upon the converging end 25 of the lifting members 24. The connection of the cable with the shifting shovel arrangement 38 is by means of a loop 39 and a ring 41 on the shovel arrangement 38. Upon the operation of a hand lever 42 acting through a rod 43 connected with a lever 44 of the winch 36, the operation of the winch can be controlled whereby to raise the shovel or to lower the same.

After the bulldozer shovel has been removed from the lifting arms 24, the shifting shovel arrangement of the present invention can be connected to the same. The shifting shovel arrangement 38 has a main frame 45 of channel section adapted to fit over the ends of the converging portions 25 of the lift members 24. There is a central hole 46 in the converging portions 25 through which a pivot pin 47 is extended to make the connection of the channel member 45 therewith. The pivot pin 47 is made secure by a cotter pin 48. The channel member 45 is made of one size and if the thickness of the converging portions 25 is less than the internal distance between the flanges of the member 45 a filler block 49 is extended into the space.

Referring now particularly to Figs. 5, 12 and 13, it will be noted that this filler block 49 is formed of three parts, a top part 51, a wood filler part 52 and a bottom part 53. The parts 51 and 53 have vertically extending flanges adapted to overlap with one another. These parts 51 and 53 can be separated to put a larger or smaller piece of wood block within the same whereby to render the filler block adaptable for different sizes of spaces. The flanges on the parts are indicated at 55. A hole 56 extends downwardly through the filler block to receive the pivot pin 47. The part 51 has a depending projection 57 aligned with a depending projection 57' on the part 53 and both of these projections extend downwardly into the apex of the converging portions 25 so that the block will be prevented from turning on the pivot pin 47. To prevent further turning of the block 49 on the portions 25 there may be extended a pin 58 downwardly through a hole 59 in the block. Or, if it seems desirable, the pin 58 can be removed and a certain amount of swinging movement of the block can be permitted. The channel member 45 can accordingly pivot on the pivot pin 47. In order to limit the amount of pivotal movement of the channel member there are provided stop pins 61 and 62 located in holes in the flange portions of the channel member and adapted to collide with the inner faces of the converging portions 25. The pins are so arranged that the channel member can be pivoted between a straight position and a position where it is angled as shown in Fig. 6 so as to cause the deposit of the dirt to one side when the shovel arrangement is unloaded and in a manner to be described hereinafter. The channel member can be made to pivot so as to discharge the dirt to the right instead of to the left as shown in Fig. 6 by simply removing the pins 61 and 62 and locating them in new holes 63 and 64.

When the lifting arms bear down, the shovel arrangement is angled so that it extends straight across the portions 25 and as shown in Fig. 3. It is retained against pivotal movement while dirt is being scooped into the same, on one side by a rod 66 connected as indicated to the top of the channel member at 67. And upon a bracket 68 extending upwardly therefrom. This rod 66 extends rearwardly and there is connected to the super structure 27 by a ring projection 69 thereof. Springs 70 and 71 are located on opposite sides of the projection 69 so as to allow a limited amount of sliding movement of the rod through the eye projection 69. These springs are held upon the rods by cotter pin arrangements 72. These springs are strong enough to hold the shovel arrangement against pivotal movement when the scooping of the dirt is being effected. The rod however retains it only in the down position for as the lifting members 24 are raised to lift the shovel arrangement the rod is forced through the eye projection 69 against the action of the spring 71 whereby to cause the shovel arrangement to be angled to the position shown in Fig. 6.

In order to retain the shovel against shifting movement when in the down position from the opposite side, there is connected a rod 74, Fig. 11, which is adapted to have its ends abut against a stop 75 on the lifting member at the left side of the tractor. This rod 74 is held against the stop by a lever 76 having an arm 77 through which the rod 74 is extended. As the lever 76 is pivoted upon a bracket 78 on the left lift member 24, the rod end will be either raised or lowered. The upper end of the lever 76 is connected by a rod 79 to a projection 81 on the super structure 27. As the shovel arrangement is raised the rod 79 will react against the super structure so as to pivot the lever 76 and cause its arm 77 to disconnect the rod end from the stop 75.

Referring now particularly to Figs. 7, 8 and 9, there is shown the manner in which the shovel is connected to the channel member 45. This shovel is indicated at 85 and the hinge connection with the lower end of the same is effected by means of hinges 86. On the upper end of the shovel 85 there is provided lugs 87 to which a stop rod 88 is pivotally connected. This stop rod extends through an opening 89 on an upright portion of the channel member 45 and has a stop nut 91 thereon which can be adjusted along the rod. As the shovel 85 is released, it will pivot downwardly as shown in Fig. 8 and will be retained in its lowered or dumping position by the stop nut 91 engaging with the portion 92 through which the opening 89 extends.

In order to retain the shovel 85 in the raised position there is provided on the rear face of the same a plurality of loop projections 93 over which a latch 94 may be extended as the shovel is brought to the lowered position. Upon the shovel engaging the ground as the lifting arm is moved downwardly the shovel will be hinged rearwardly so that the loop 93 will engage with the latch 94. The latch 94 is pivoted to a bracket 95 and is retained in its down position by a spring reacting between the latch and the bracket. This spring is indicated at 96. Pivoted in the bracket 95 is a shaft 97 having cams 98 thereon adapted to engage with the latches 94 to raise them at times when it is desired to dump the dirt contained in the shovel 85. Also on the shaft 97 is an arm 99 to which a rope 101 is connected and extends rearwardly. When this rope is pulled the shaft 97 is pivoted and the latches 94 are released from the projections 93.

Referring now particularly to Fig. 14, there is shown a modified arrangement by which the shovel 85 is hinged to the channel member 45. An extra long hinge 101' is used for this purpose. This hinge 101' is extended forwardly so that the hinge joint 102 will lie ahead of the rear corner of the shovel whereby as the shovel is hinged downwardly a space will be left in rear of the same through which dirt can fall out.

While various changes may be made in the detail construction, it should be understood that such changes shall be within the spirit and scope of the present invention as defined by the appended claims.

I claim:

1. An earth working machine comprising a tractor, lifting means connected to the tractor for pivotal movement between lowered and raised positions, a shovel supporting member connected to the lifting means for lateral shifting movement, a shovel hinged upon the supporting member and adapted to be dropped down to release the dirt collected by the same, means for automatically latching the supporting member and the shovel against lateral shifting movement in lowered positions of said lifting means, means for automatically releasing said latching means and simultaneously shifting said supporting member and shovel laterally relative to said lifting means as an incident of lifting means elevation from lowered positions, and means for releasably retaining the shovel in a raised position upon the supporting member and against downward hinging movement therefrom.

2. An earth working machine as defined in claim 1, and said means for retaining the supporting member against pivotal movement comprising a rod pivotally connected to the supporting member and extending rearwardly therefrom to overlie one of the lifting means members at times, a stop means upon said one of the lifting means members against which the rearward end of said rod may abut when said lifting means is in lowered position, and a lever hingedly carried by said one of the lifting means members in guiding relation with the rod and connecting with the tractor to react thereagainst whereby to automatically raise the rod from engagement with the stop means as the lifting means members are raised.

3. An earth working machine as defined in claim 1, and said means for retaining the supporting member against pivotal movement comprising a rod pivotally connected to the supporting member and extending rearwardly therefrom, and a stop means upon one of the lifting means members against which the rod may abut, and a lever engaging with the rod and connecting with the tractor to react thereagainst whereby to automatically raise the rod from engagement with the stop means as the lifting means members are raised, and a member pivotally connected between the opposite end of the supporting member from which the first mentioned rod is connected thereto and the tractor so as to cause, as the lifting means are raised and the first mentioned rod is released, the shifting movement of the supporting member to brace and reinforce the earth at one side of the machine.

4. An earth working machine as defined in claim 1, and stop rods with an adjustable stop nut thereon slidable through the supporting member and pivotally connected to the shovel to limit its downward movement of the shovel relative to the supporting member.

5. An earth working machine as defined in claim 1, and said supporting member having a forward wall, said shovel being connected to the supporting member so that its back wall will hinge at its low point from the forward wall of the supporting member to trace and reinforce said shovel during charging thereof.

6. An earth working machine as defined in claim 1, and said shovel supporting member being of channel section, and adjustable block means adapted to lie within the channel supporting member and upon the top of the lifting means to adapt the supporting member to the different thicknesses of lifting means and to provide a wear support for the top of the supporting member, said block comprising top and bottom wear pieces and an intermediate and removable filler piece.

7. An earth working machine comprising a tractor, lifting members connected to the opposite sides of the tractor, for pivotal movement between lowered and raised positions, said members converging at their forward ends and connected together, a shovel supporting member carried by and forwardly of the converging ends of the lifting members for lateral pivotal movement relative thereto, a shovel hinged upon the supporting member for movement therewith and adapted to be dropped down to release the dirt collected by the same, means for automatically latching the supporting member and the shovel against shifting movement in lowered positions of the lifting members, means reactive to lifting member elevation to automatically release said latching means and simultaneously laterally shift said supporting member and shovel, and means for releasably retaining the shovel in a raised position upon the supporting member and against downward hinging movement therefrom.

ROBERT E. BOULTON.

REFERENCES CITED

The following references are of record in the file of this patent:

UNITED STATES PATENTS

| Number | Name | Date |
| --- | --- | --- |
| 798,246 | Wolfe | Aug. 29, 1905 |
| 1,412,159 | Bolte | Apr. 11, 1922 |
| 2,184,688 | Le Bleu | Dec. 26, 1939 |
| 2,243,306 | Ashton | May 27, 1941 |
| 2,305,119 | Walker | Dec. 15, 1942 |
| 2,307,655 | Arps | Jan. 5, 1943 |
| 2,387,764 | Maxwell | Oct. 30, 1945 |
| 2,405,312 | Mandt | Aug. 6, 1946 |

Certificate of Correction

Patent No. 2,471,192.　　　　　　　　　　　　　　　　　　　　　May 24, 1949.

ROBERT E. BOULTON

It is hereby certified that errors appear in the printed specification of the above numbered patent requiring correction as follows:

Column 6, line 12, claim 3, for the words "to brace and reinforce" read *and the shovel to deposit*; line 25, claim 5, for "trace" read *brace*;

and that the said Letters Patent should be read with these corrections therein that the same may conform to the record of the case in the Patent Office.

Signed and sealed this 18th day of October, A. D. 1949.

[SEAL]

THOMAS F. MURPHY,
*Assistant Commissioner of Patents.*